United States Patent
Ballinger et al.

(10) Patent No.: US 10,623,591 B1
(45) Date of Patent: Apr. 14, 2020

(54) AUTOMATED BOOK CREATOR

(71) Applicant: Hacche Online Limited, Cheltenham (GB)

(72) Inventors: Ruth Ballinger, Chalford (GB); Nick Ponting, Cheltenham (GB)

(73) Assignee: Hacche Online Limited (GB)

( * ) Notice: Subject to any disclaimer, the term of this patent is extended or adjusted under 35 U.S.C. 154(b) by 0 days.

(21) Appl. No.: 16/405,073

(22) Filed: May 7, 2019

(51) Int. Cl.
*H04N 1/00* (2006.01)
*B41F 17/02* (2006.01)

(52) U.S. Cl.
CPC ......... *H04N 1/00188* (2013.01); *B41F 17/02* (2013.01); *H04N 1/0019* (2013.01); *H04N 1/0048* (2013.01); *H04N 1/00167* (2013.01); *H04N 1/00456* (2013.01)

(58) Field of Classification Search
CPC .............................. H04N 1/00188; B41F 17/02
See application file for complete search history.

(56) References Cited

U.S. PATENT DOCUMENTS

| 5,397,156 A * | 3/1995 | Schach | B41F 17/02 206/424 |
| 2006/0150848 A1* | 7/2006 | Deutsch | B41F 17/02 101/483 |

* cited by examiner

*Primary Examiner* — Ibrahim Siddo
(74) *Attorney, Agent, or Firm* — Invention To Patent Services; Alex Hobson

(57) ABSTRACT

A method of automatically producing a book is disclosed. The book is generated from a database of source content items. As an example, a content item may be a cookery recipe. Typically, the source content items have been created for presentation on the web. The method includes the steps of processing the source content items to create publishable content items, allowing the user to select content items according to criteria, and then iteratively applying templates to the selected content items to optimize a print layout associated with each content item. The print layouts may be composed into a book, which may be automatically printed and sent to the user or to the user's order.

20 Claims, 10 Drawing Sheets

Object: Title. One Data Field
Properties: Font Bold: Font Colour, XY coordinates, Position, Current Y position.
Return: Bottom Y position Object: Description, One Data Field
Properties: Font Bold: Font Colour, XY coordinates, Position, Current Y position.
Return: Bottom Y position Object: Info. 4 Data Fields
Properties: Font: Bold: Font Colour, XY coordinates, Position, Current Y position
Return: Bottom Y position Object: Ingredients. 1 Data Fields
Properties: Font: Bold: Font Colour, XY coordinates, Position 1 or 2 columns, Current Y position.

Object: Method. 4 Data Fields
Properties: Font: Bold: Font Colour, XY coordinates, Position 1 or 2 columns, Start page, Overflow to next page. Current Y position.
Rules: Method will try and fit a single bullet point into a single column.
Return: Bottom Y Position, over flow page Object: Image. 1Data Fields
Properties: XY Coordinates, Position 1 or 2, Current Y position.
Return: Bottom Y Position Object: Nutrition. 1Data Fields
Properties: XY coordinates, Position, Page 1 or 2, Current Y position.
Return: Bottom Y position Object: Notes
Properties: XY coordinates, Position, Page 1 or 2, Current Y position.
Return: Bottom Y position

FIG. 8

Mushroom risotto

Barney guides you through a step-by-step guide to making mushroom risotto

Serves 4   EASY

Ingredients
50g porcini mushrooms
vegetable stock
1 onion
250g chestnut mushroom
300g risotto rice
Handful parsley
50g parmesan chest Method 1 Put the dried mushrooms into a large bowl and pout over 1 litre boiling water. Soak for 20 mins, then drain into a bowl, discarding the last few tbsp of liquid left in the bowl Crumble the stock cube into the mushroom liquid and then squeeze the mushrooms 2 Tip the rice into the pan and cook for 1 min. Pour over the wind and let it bubble to nothing so the alcohol evaporates. Keep the pan over a medium heat and pour in a quarter of the mushroom stock. Simmer the rice stirring often, until the rice has absorbed all the liquid.

IMAGE 397 kcals ~ fat 5g ~ saturates 1g ~ carbs 65g sugars 19g  ~ fibre 11g ~ protein 18g ~ salt 0.6g Notes

FIG. 10

AUTOMATED BOOK CREATOR

BACKGROUND OF THE INVENTION

Field of the Invention

The present invention relates to an automated book creator, particularly to systems and methods of processing source data to produce print layouts in an automated workflow.

Background

There is a large market for personalized goods. At a basic level, a personalized product, for example a mug, may just have a name or image printed onto it, to the customer's order. Books may also be personalized, for example by printing the book to order and adding a name, dedication, or other text, to a page.

There are a class of books which include multiple, more-or-less standalone, items within them. An example is a recipe book. A recipe book may include, for example, twenty recipes. These books are popular and are widely available for sale. A keen cook might own dozens of recipe books, but may only use a handful of recipes in each.

It is common for people to "collect" favorite recipes by photocopying them from books, printing them from the internet or copying them from friends. The collected recipes might be pasted into a book or put into a folder, for future reference.

There are commercial publishers who not only publish recipe books, but hold large databases of recipes which may be made available on the internet on various terms. The recipes may be made available for free with the publisher receiving revenue from online advertising, or could be made available on a subscription model. It is common for people to download or print recipes from such websites and add them to their recipe "collections".

From time to time a publisher may make use of such content and bring out a curated collection of recipes which may be published as a book. The effort involved in producing a high quality book is significant, even assuming that high quality underlying content is already available. Consideration has to be given to the selection of recipes within the book to achieve a wide appeal, but also much time needs to be spent editing, formatting and arranging the content to achieve a professional, high-quality layout, which consumers will be prepared to spend money on. Content, high-quality as it may be, which has been designed and stored for presentation on a website may not be suitable for high-quality presentation in a printed book without significant curation and manipulation. Because of the large costs associated with such an exercise, the publisher will only produce such a publication when they can be reasonably confident of a certain number of sales. This means that niche interests are badly served in the market, and because of the series of compromises made to achieve the required widespread appeal, it is quite likely that very few individual purchasers are delighted with every single recipe in the book.

Note that although a recipe book is given as an example, the same problems arise for a variety of types of content. For example, publishers may hold databases of countryside walks, reviews of pubs and restaurants, descriptions of travel destinations etc. The problem arises in any context where books are produced which include a selection of discrete stand-alone content items.

It is an object of the invention to substantially automate the process of producing a book, to the extent that a personalized book may be economically produced, i.e. a print run of one item, which includes a unique selection of content, and in which the presentation is close to the professional standard expected for a large print-run edition.

SUMMARY OF THE INVENTION

According to the present invention, there is provided a method of producing a book, the method comprising the steps of:
  accessing a database of source content items;
  processing the source content items to create publishable content items by changing the source content items according to pre-set rules;
  providing a user interface and soliciting input of one or more filtering criteria from a user;
  presenting a selection of the publishable content items on the user interface, the presented publishable content items being selected according to the filtering criteria;
  providing on the user interface a facility for the user to further select from the presented content items, or request further or different content items to be presented, to define a group of user-selected content items;
  accessing a library of templates, and assigning a template to each of the user-selected content items;
  for each user-selected content item and assigned template:
    applying the user-selected content item to its assigned template using a set of parameters to generate a print layout;
    automatically testing the generated print layout against pre-set layout quality criteria;
    if the layout quality criteria are met, then finalizing the print layout;
    otherwise, adjusting the parameters of the user-selected content item as applied to the template, to optimize the print layout, and returning to the testing step;
  composing the finalized print layouts into a final book layout; and printing a book according to the final book layout.

The invention allows a high-quality book to be created, in an edition of one, to an individual customer's order. The customer chooses from a library of content items in a database (for example, recipes on a recipe website), to create a book which entirely meets their requirements. Whereas in the past customers have purchased recipe books and may make use of a minority of recipes within each purchased book and be less enthusiastic about the others, the invention provides the customer with the opportunity to own a completely bespoke book, containing recipes individually chosen by them. Despite the fact that the book is made substantially automatically, which is the only way to produce it economically at a price the customer can afford, the iterative process of applying content items to templates and adjusting parameters to optimize the presentation ensures that the quality of the book is close or equal to that achieved in many mass-published volumes, in which the layout is created manually by a designer.

By asking the user for filter criteria and presenting a selection of items for further selection by the user, several aims are achieved. Firstly, the underlying content is somewhat protected from unauthorized and unpaid use. While the user needs to be able to see the selection of content which he is going to get in order to make a purchasing decision, the operator of the system, which may hold intellectual property rights attached to the content and have a substantial interest in preventing unauthorized use, is able to avoid making the underlying content library available in a format where large unauthorized extractions could be made.

A further advantage of the filtering, presentation and further selection is that the user is assisted with making a selection from a large database which may contain thousands or even tens of thousands or more content items. To provide a product which users will use and enjoy using, it is important not to present too much data at once. The filtering, presentation and further selection steps leverage the value in a large database, because it is highly likely that there will be enough content items to give the customer a choice even with fairly niche preferences, but without requiring the user to go to the trouble of sifting through a large number of content items.

As an example, where the content items are recipes and the method is a method of producing a recipe book, the filtering criteria may include, for example, whether the recipe is suitable for vegetarians. In general, certain criteria may be discrete, or absolute. A recipe being vegetarian, or not, is an example of such an absolute criterion. Some criteria may be extent, or value-based. For example, in a recipe-based embodiment, a user may want to see only recipes with less than 600 calories per portion. In very general terms, each criterion is a predicate function on one or more items of metadata attached to the content item. Metadata used to apply the criteria are preferably stored in the database of source content items, but in some embodiments could be stored in an intermediate or separate database.

After selecting criteria, the user is presented with a selection of content items from the database. The user may select the content items which he wants to include in his personalized book. Typically, a single book will have a preset limit as to the number of content items which can be included, depending on the physical format of the finished product. In some embodiments though the user may be able to choose more or fewer content items, and the number of pages in the book will be adjusted accordingly. The user may be charged, for example, based on the final page count or on the number of content items selected.

If the user does not wish to select from the presented content items enough content items to fill his personal book, then the user can cause further or different content items to be presented. This may be done by changing the filter criteria, including after some content items have already been selected. In some embodiments, this process may be quite structured and guided, in that, for example, the user could be guided to choose content for several distinct "chapters". In a recipe book, example chapters could be starters, main courses, and desserts. These chapter headings correspond to "tags", which are items of metadata about the recipes in the database, and so form a part of the criteria for retrieving content items, though may be selected in a slightly different way in the user interface.

Source content items may be tagged as suitable for inclusion in certain chapters, and in some embodiments the relations between content items and chapters may be overlapping. For example, a recipe book might have chapters "starters" "mains" and "desserts", but alternatively could divided by occasions and have chapters "Christmas", "birthdays", etc. Some recipes may be suitable either as starters or mains, and starters, main courses and desserts are all eaten at Christmas, so the tagging of content items may be flexible to accommodate this. Furthermore, in some embodiments a user may be able to choose chapter headings across different categories of chapter, for example, a book could have chapters for "starters", "mains, "desserts" and "Christmas".

In some embodiments, there may be an initial combined process of choosing the overall structure of the book by choosing chapters that will be included and choosing the criteria which will be used to filter the content items. In this way, the user can refine the filter criteria to ensure that there are suitable content items to fill the required chapters. For example, in a book of countryside walks, if the user has chosen only flat walks but wants a chapter of walks in a mountainous region, then there may not be enough content items in the database to fill that chapter according to the user selected criteria. The user will be invited either to loosen the criteria or to choose a different selection of chapters. Once chapters have been chosen and suitable filter criteria applied, the user may be presented with a matrix of chapter headings and associated presented publishable content items.

In many cases, the user's criteria will match a large number of content items within the source database, many more than can be usefully or desirably shown to the user at once. In that case, presented content items are preferably ranked initially by a number of rules, for example ranking recipes which have a high number of good reviews. There may be a random or "blended" aspect to the ranking algorithm, so that the user is presented with a unique selection which is not the same as the selection presented to other users inputting similar criteria. The ranking may be blended in the sense that the ranking system may return mainly highly-rated content items, but may also randomly include content items which have not been rated at all, or always include some new items, for example items which have been inserted into the database in the past month, to ensure that the presented content is always fresh.

Once the content items which meet the user's criteria have been ranked, the top ranked items may be presented. For example, the top ten ranked items could be presented in embodiments. The user may then select from the presented items the items he wants to include in his personal book. In one embodiment, the user interface is adapted to always display a pre-set number of content items, or a pre-set number of content items for each chapter. When a presented content item is selected for inclusion in the book, it is removed from the list of items available to select and another item may be presented in its place, for example according to the ranking rules. Alternatively, a user may decide that he definitely does not want to include a particular content item, in which case that content item is rejected, hidden from the list of presented items and another item is selected to be presented in its place, according to the ranking rules.

When a user selects or rejects presented items, the selection or rejection may feed back to the ranking algorithm. This could be in a very basic way, for example, the ranking algorithm could just count the number of selections and rejections against each content item, and prefer content items which are often selected and demote in the ranking content items which are often rejected. Alternatively, the ranking algorithm could be more complex, for example a machine learning agent based on reinforcement learning or other techniques. A machine learning agent could learn for example, based on user behaviour over time, that certain selected criteria imply that the user does not want certain recipes which technically meet the criteria. For example, it might be found that users who request low-calorie recipes tend to reject recipes containing certain ingredients, even if the estimated calorie content of the portion is within the requested limits.

Information about past selections or rejections may be taken into account on a per-user basis, or globally. In some embodiments, demographic or other data about the user may be taken into account, for example, if certain recipes are generally rejected by young people, then the ranking algorithm may rank those recipes less highly for young users.

The database of source content items may be accessed in any suitable way. In some embodiments, the source content database may be stored on a remote system from the computer system which carries out the automated steps of the method. The source content database may be accessed by an API link "on the fly", or alternatively may be synchronized to an external database, or simply a local copy may be made. Some data associated with content items may be stored separately, for example, in some embodiments images may not be stored in the same database as text. Some commonly-accessed data, for example headers, "thumbnails" and summaries, may be in a separate database, or a separate table, so that partial data may be retrieved in the process of selecting the recipes without the overhead of retrieving full records. Tags and/or search keywords associating records with particular chapters, or concepts that may be searched for, may be stored in another table. As long as there is the facility to connect all the parts together and access the data to allow the steps of the method to take place, different embodiments may work in different ways.

Processing the source content is done in order to apply consistency to the content and make it suitable for publication in book form. In many embodiments, the source content will have been designed primarily for web presentation, and several changes may need to be made to make it suitable for use in book form. Hyperlinks obviously need to be removed, but this is a more complex problem than simply stripping out the links because in some cases the text may have been written specifically with the hyperlink in mind. For example, "to find out more about the nutritional properties of corn, click here" does not make sense once a hyperlink is stripped away. However, the sense could be retained by inviting the reader to visit the publisher's website. Therefore, natural language processing techniques may be used to identify passages which need to be altered for use in print. Such passages could be automatically flagged for changes to be manually inserted. Alternatively, in some embodiments, changes might be automatically made, or made automatically and flagged for human review.

An example of where source content needs to be processed for consistency is in the display of fractions. With content designed for web display, absolute consistency in display is often not observed, since only one content item is probably going to be displayed at once. Different content items may therefore use different ways of displaying the same thing, for example:

½ tsp. sugar
½ Tsp. sugar
0.5 tsp. sugar

In the context of a printed book, this sort of inconsistency looks unprofessional and detracts from the quality of the finished product. Therefore, processing the source content items into publishable content items may include applying preset "replacement" rules to ensure that the same information is presented in the same way throughout all content items.

It may be that even after processing the publishable content items in this way, some level of inconsistency in the language or style of the writing will inevitable remain in a large database of content items. One way of handling this is by applying clustering algorithms to the content items, and using this information in the ranking algorithm so that content items presented to the user for possible selection are all relatively consistent with each other, and with content items already selected, in terms of the language and style. Serious outliers identified by the clustering algorithm could be flagged for manual review and possible redrafting.

Processing of the source content may always be done in a particular way, i.e. it may be hardcoded into an embodiment of a system implementing the method. In addition, a system operator, for example a publisher, may define application-specific rules. For example, different operators may prefer to standardize on displaying a fraction as ½ or as ½.

In addition, certain transformations may be made to the source content according to either user-defined or system-operator-defined preferences. For example, recipes may be given with quantities in metric or imperial mass measures (e.g. kg or lb/oz), or in volumetric measures (e.g. cups). In some embodiments, either data for different types of measures is stored in the source content for selective retrieval according to user or operator preference, or a conversion algorithm may be applied.

Processing the source content may also include the step of assessing each content item against each template in the template library to determine compatibility. Not all content items may be compatible with all templates. For example, templates may have maximum character counts in certain fields, and if content items contain more than the maximum character count then they cannot be assigned to that template.

In embodiments, there may be a set of templates, for example, for an A5 size book, a set for an A4 size book, etc. Each size of book has multiple templates associated with it. Some content items will not be compatible with all templates, due to limits on character counts, for example. It is possible that some content items will not be compatible with any templates, or are not compatible with any templates associated with a certain format of product. In this case, such content items will not be presented to the user for possible selection.

The assessment of compatibility in some embodiments may go beyond an assessment as to whether a particular content item is compatible with a particular template or not. It may be possible to estimate a value indicating the overall quality that will be achieved when applying the content item to the template. For example, a recipe with a very small number of ingredients might be able to fit into a particular template, but the amount of whitespace on the page may give a lower overall presentation quality than another template which gives more space to a photograph associated with the recipe. Therefore, each content item may be tagged with an "estimated quality value" when associated with each possible layout. This estimated quality value may be taken into account when ranking the content items for possible presentation—for example if the highest quality value associated with a compatible template in the selected book format is quite poor, then the content item may be demoted in the ranking. Furthermore, the estimated value may be taken into account when allocating content items to templates, before the iterative process of optimizing parameters. This may significantly increase the overall quality of presentation in the finished book, while still providing a substantially automated process.

As well as selecting content items to be inserted into a book, the user may be invited to define for himself certain aspects, for example the user may be able to define the title of the book, upload photographs for the cover, or even edit aspects of the selected content items. The ability of the users to edit content items may be defined by the system operator, and might be significantly restricted, for example user's may be able to edit the title of a recipe for example to say "Bob's favorite cookies", but the ingredients and method of the recipe will be unchanged. This allows the content owner to allow a level of personalization, while preserving the integrity of the content associated with their brand—e.g. it may be considered important that any recipe books produced by the system contain tried and tested recipes that definitely work, since that it important to the reputation of the publisher whose brand may appear on the book, albeit it is personalized.

The process of applying a template to a content item, generating a print layout and then testing the generated layout against quality criteria, iteratively repeating the process and changing the parameters to optimize the measured quality of the generated layout, is designed to ensure a very high quality layout, comparable with the quality that could be created manually by a skilled designer.

Templates may be initially assigned to content items based on rankings, some templates being generally preferred to others, and based on precalculated metadata associated with individual content items indicating their compatibility (on a binary basis, compatible or not) with particular templates and possible also their estimated quality when associated with particular templates (a nonbinary value).

In assigning templates to content items, in some embodiments a randomized aspect may be included to provide a pleasing variety of formats within the book. In some embodiments, hard or fuzzy rules may be applied to the overall arrangement of formats, as well as to individual pairings between templates and content items. For example, three content items in a row with the same format may be disallowed altogether, or discouraged or demoted in a ranking taking into account other factors.

In measuring the layout quality criteria in a particular iteration of applying a content item to a template, various aspects of the generated layout may be measured. Obviously, some scenarios will be completely unacceptable, for example the height of an object exceeding the page height so that content runs off the end of the page. Other arguable faults may be less preferred, and the system will try to optimize to avoid them. Examples may be "widows" or "orphans", which are single lines of text at the beginning or end of a column.

Special consideration may be given to large heavily formatted content sections. For example, correct formatting of content sections which contain bullet points in templates with multiple columns is an important factor in achieving a pleasing layout ideally, bullet lists should be divided equally between two columns, making the columns the same length and also making such that each bullet remains intact within its starting column. In each iteration, the placed data is measured and compared. If the columns are too imbalanced or the overall length of a column has been exceeded, then a bullet may have to be split, again this may be done as an iterative process avoiding splitting a word, and preferably avoiding splitting a sentence or clause. This iterative process of measuring, splitting, combining and re-measuring ensures the best outcome for the data within the template assigned. Thus, different considerations are taken into account depending on the nature of the data being placed in each template section.

In some embodiments, a system operator may be able to design templates and insert them into the library using a visual user interface.

In some embodiments, the end user may be able to choose layouts to some extent, instead of completely automating the process of allocating layouts to selected content items.

Typically, the method will include a step of automatically accepting a payment from the user before a book is printed. In addition, customer details required to fulfil the order will be collected, for example, name and address.

The final print layout may be rendered in two parts—one part for the cover and another part for the internal pages. The final print layout may be rendered in a common file format which is compatible with multiple printers and print services, for example PDF. In many embodiments, the final print layout is sent to a remote location together with fulfilment information in order for the book to be printed and dispatched to the customer.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

For a better understanding of the present invention, and to show more clearly how it may be carried into effect, specific embodiments will now be described with reference to the accompanying drawings, in which:

FIG. 8 illustrates how a content item may be applied to a template;

FIG. 10 illustrates an example print layout generated by the method of the invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Figure 1:
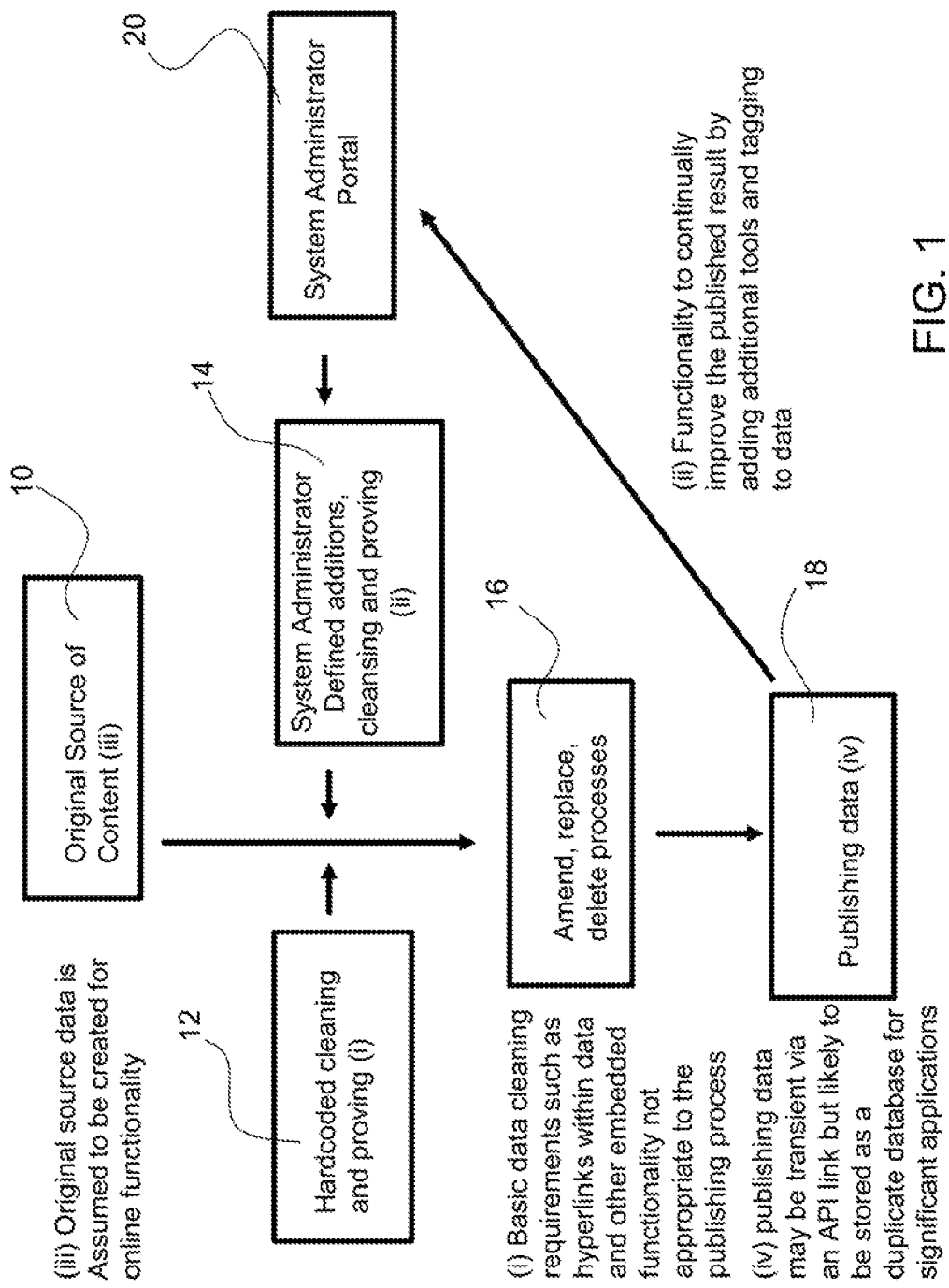
FIG. 1 is a flowchart showing steps of accessing a database of source content items and processing the source content items to produce publishable content items.
Figure 2:
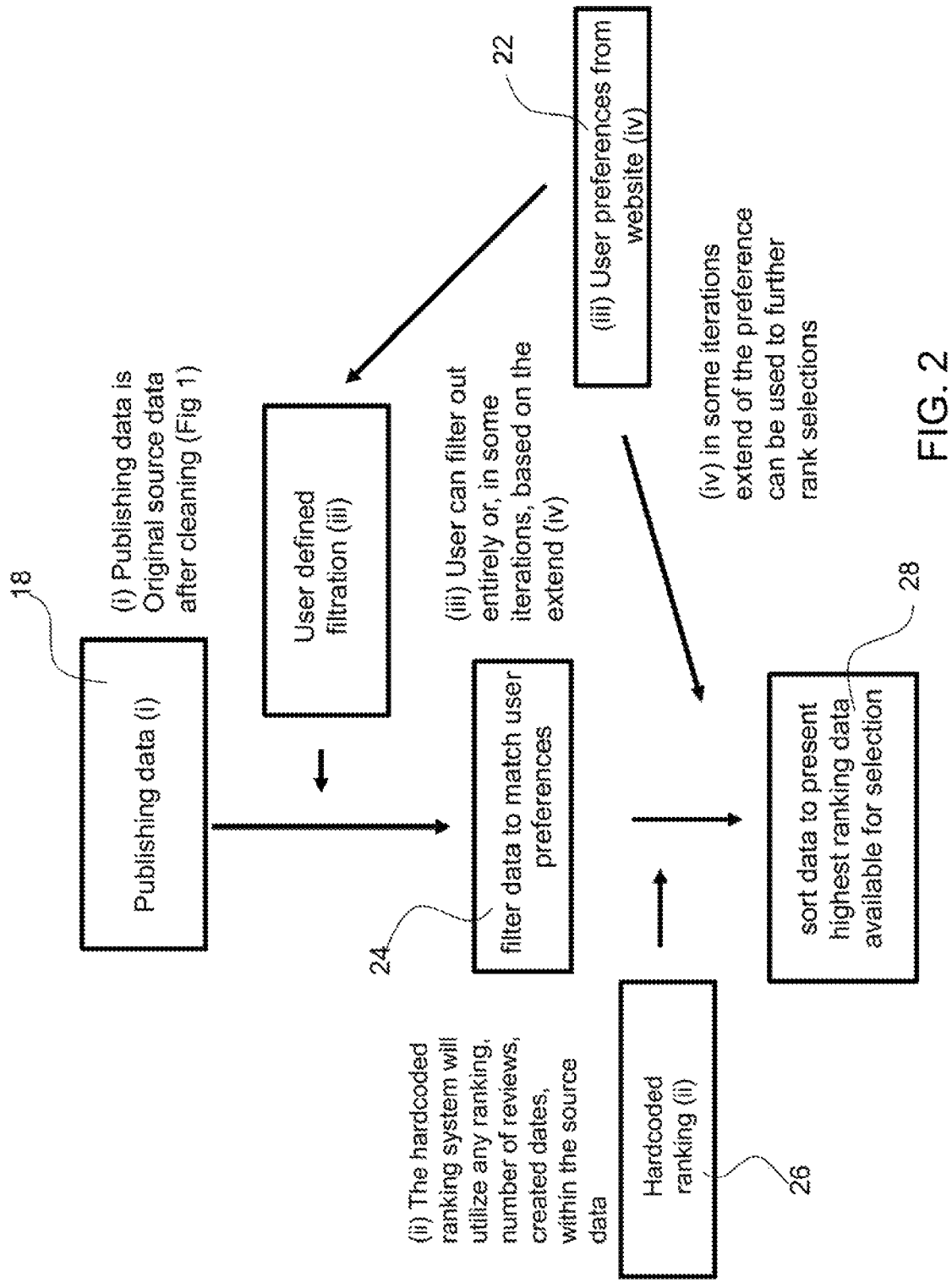
FIG. 2 is a flowchart showing the process of presenting a selection of content items according to filter criteria.
Figure 3:
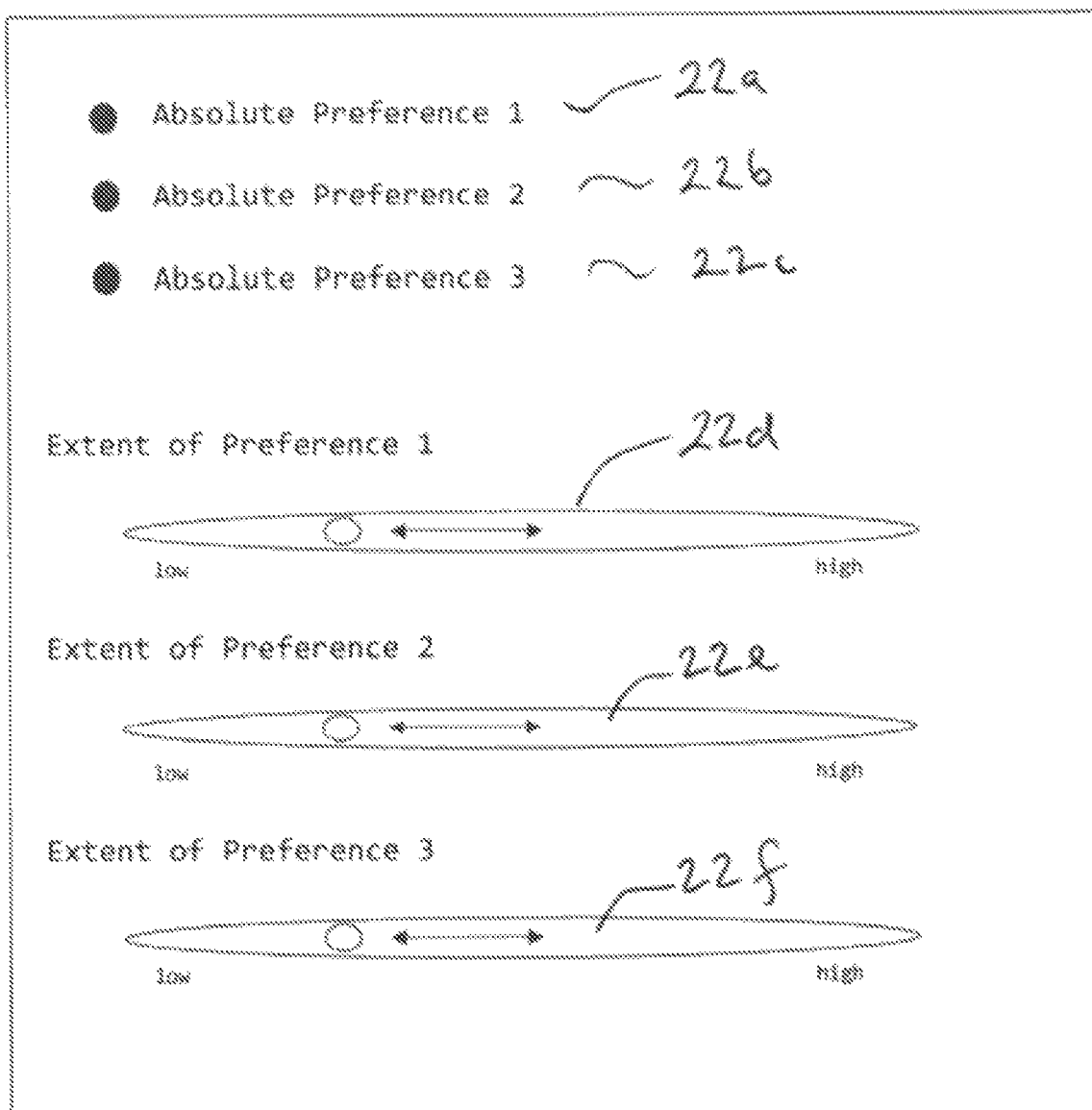
FIG. 3 is an example of a user interface which may be presented to a user to allow input of filter criteria.
Figure 4:
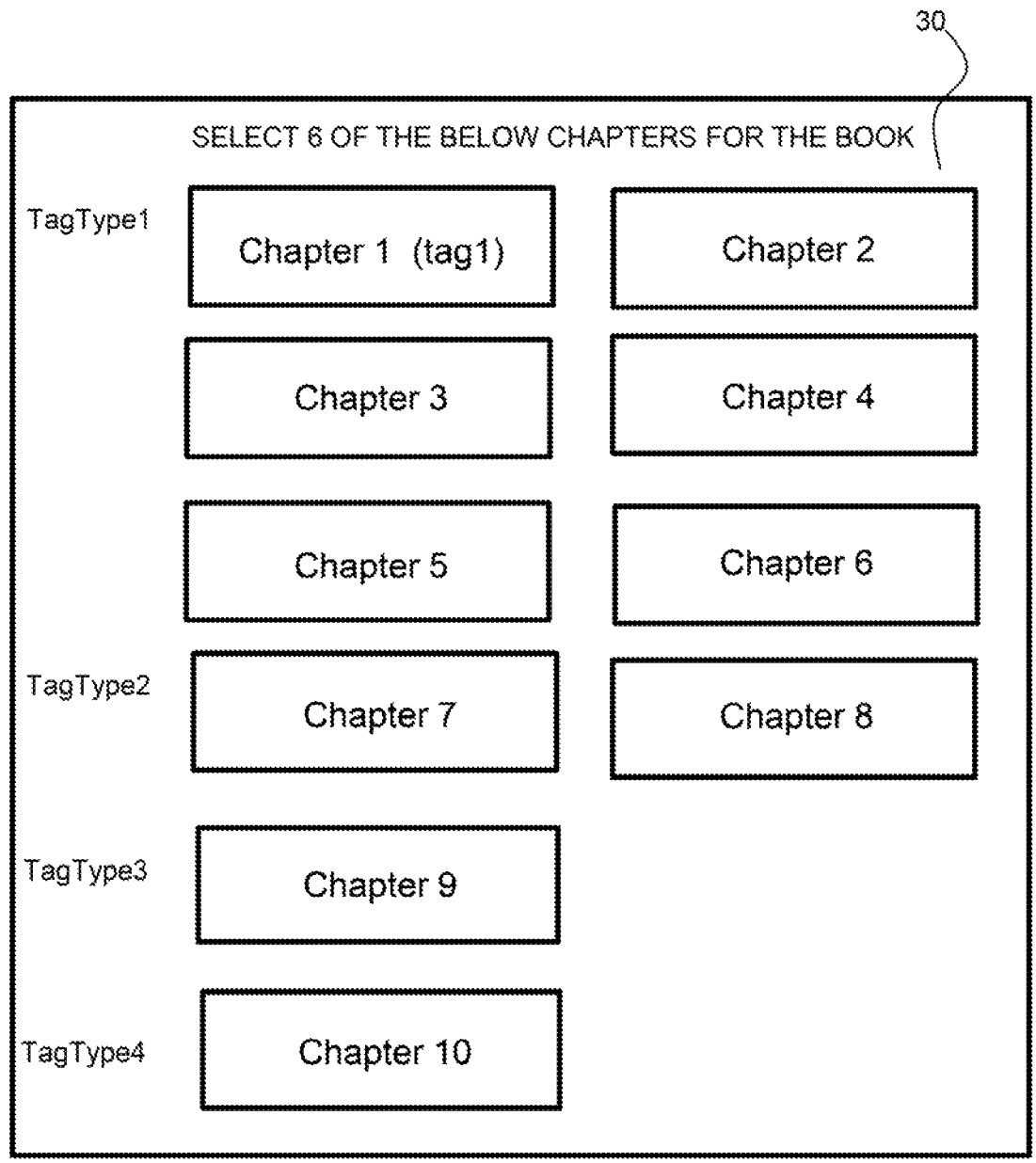
FIG. 4 is an example of a user interface which may be presented to a user to allow selection of chapters for a book.
Figure 5:
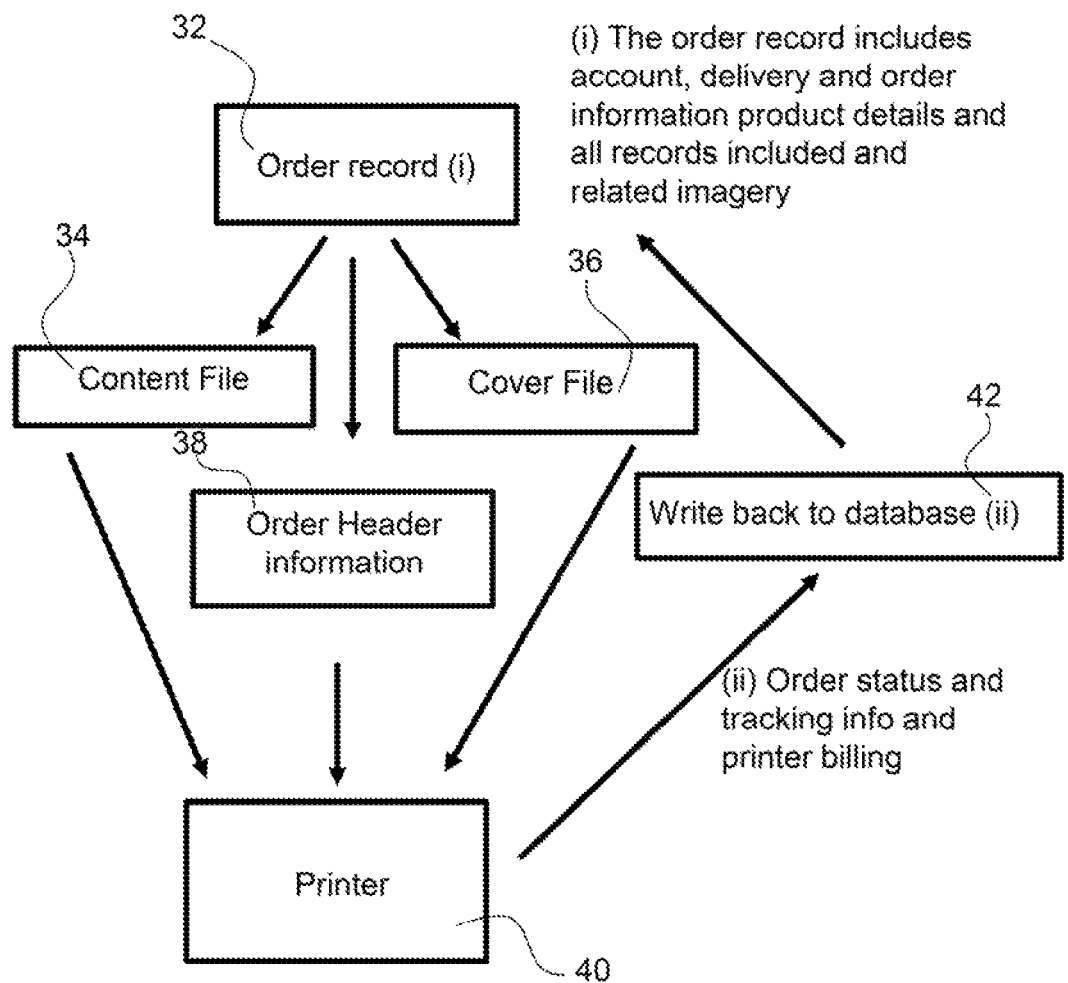
FIG. 5 is a flowchart illustrating a print and fulfilment process, for printing a book according to the final print layout and delivering it to a user.
Figure 6:
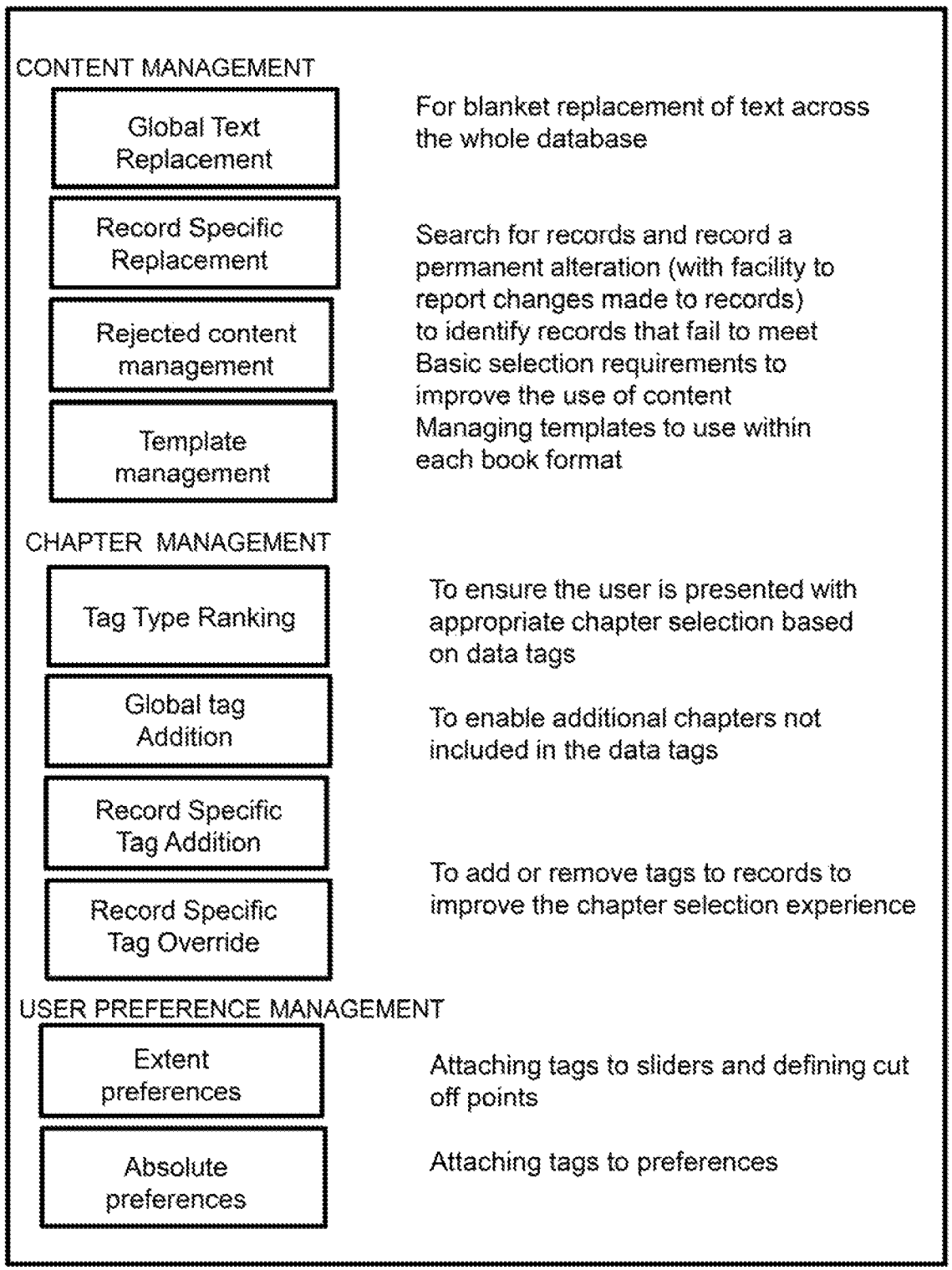
FIG. 6 shows an example user interface of a system operator's control portal.
Figure 7:
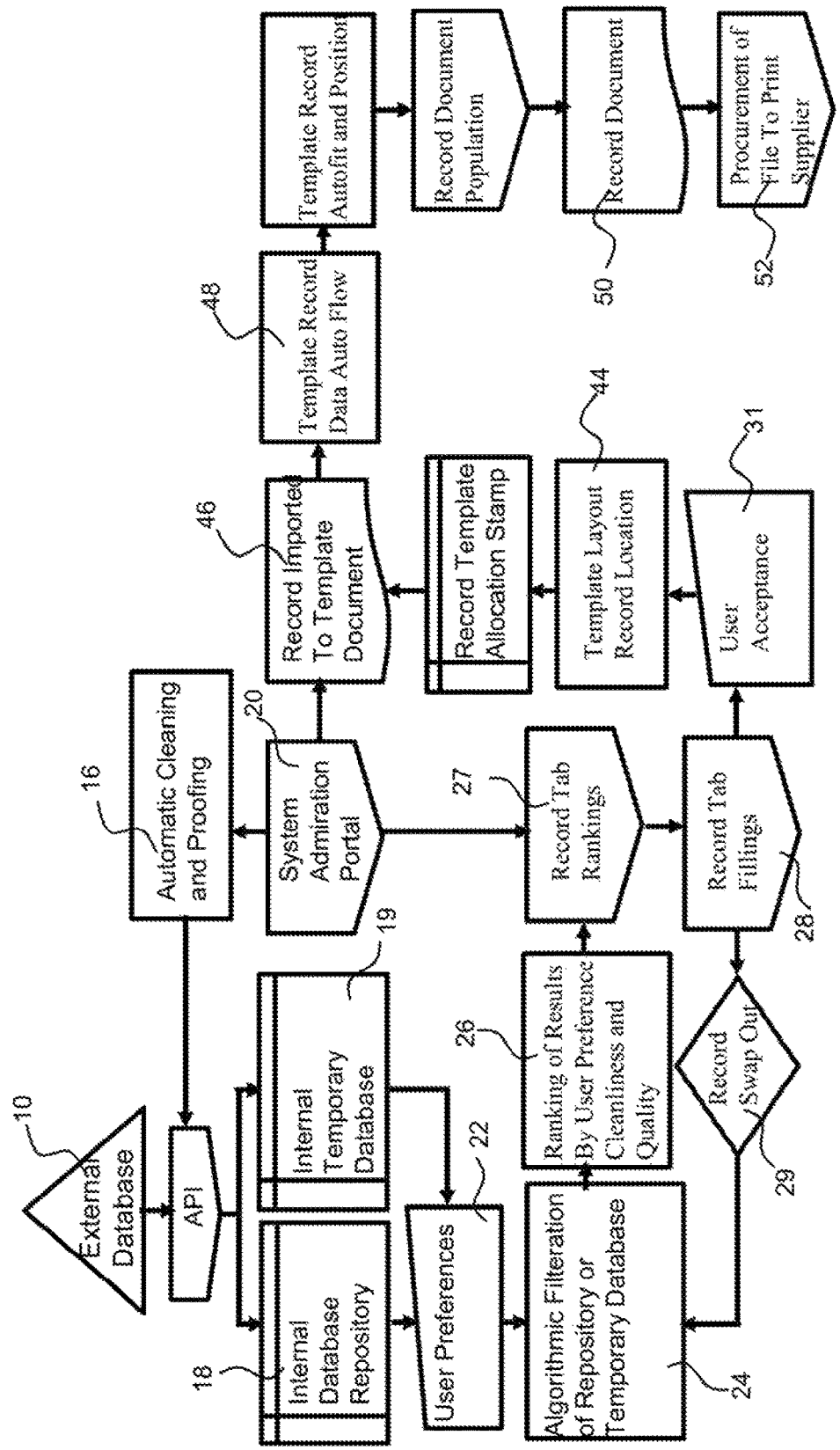
FIG. 7 is a flowchart showing the overall method of the invention.
Figure 9:
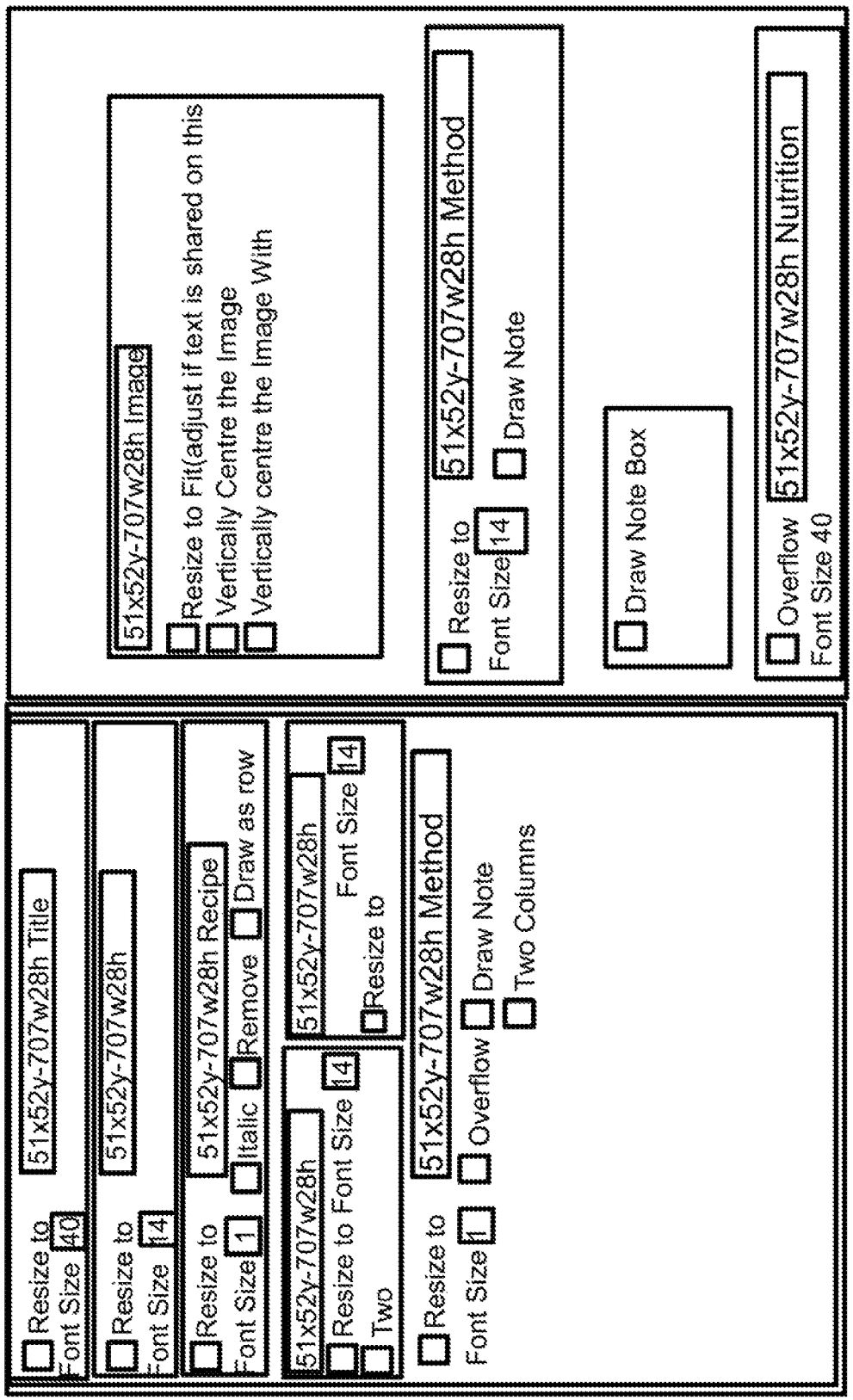
FIG. 9 illustrates further how a content item may be applied to a template.

For a better understanding of the present invention, and to show more clearly how it may be carried into effect, specific embodiments will now be described with reference to the accompanying drawings, in which:

FIG. 1 is a flowchart showing steps of accessing a database of source content items and processing the source content items to produce publishable content items;

FIG. 2 is a flowchart showing the process of presenting a selection of content items according to filter criteria;

FIG. 3 is an example of a user interface which may be presented to a user to allow input of filter criteria;

FIG. 4 is an example of a user interface which may be presented to a user to allow selection of chapters for a book;

FIG. 5 is a flowchart illustrating a print and fulfilment process, for printing a book according to the final print layout and delivering it to a user;

FIG. 6 shows an example user interface of a system operator's control portal;

FIG. 7 is a flowchart showing the overall method of the invention;

FIG. 8 illustrates how a content item may be applied to a template;

FIG. 9 illustrates further how a content item may be applied to a template; and

FIG. 10 illustrates an example print layout generated by the method of the invention.

DESCRIPTION OF THE PREFERRED EMBODIMENT

Referring firstly to FIG. 1, the flowchart shows the steps of accessing source content items, and processing them to generate publishable content items.

In box 10 the source content items are accessed. The source content items may be stored on a local or remote database, which may be any suitable kind of data storage system. The source content items have been created and designed for use online. As such, there may be various features which make the source content items unsuitable for direct use in print. For example, hyperlinks will need to be removed and surrounding wording may need to be changed to accommodate removal of hyperlinks. The style and use of particular characters, for example "½" or "1/2", "&" or "and", may be inconsistent.

Some basic transformation rules are hardcoded into the system in box 12. In addition, transformation rules defined by the system operator are applied in box 14. The transformation rules defined by the system operator may take account of particular features of the source content being accessed in a particular embodiment. Moreover, the system operator may continually update and tailor the rules so that an embodiment of the system improved over time. This may be done in addition to manual direct editing of individual content items by the system operator. This might be done in response to an automated flag which determines that a particular content item is probably not suitable for print, but cannot be automatically corrected.

In box 16, all applicable rules, whether hardcoded or system-operator defined, are applied to source content items. This creates a repository in box 18 of publishable content items. The repository 18 of publishable content items may be transient, i.e. content items are processed in box 16 as they are called for by downstream parts of the system, but in embodiments of any significant size it is likely that the repository 18 will be in the form of a substantially complete, but transformed, copy of the source database 10.

Where the repository 18 is made as a copy of the source database 10, it may be periodically refreshed in order to take account of updated rules, in particular updated system-operator-defined rules 14. This ensures that the publishable content items are always of the highest possible quality.

On inspection, either manual, automatic, or a combination of the two (e.g. automated flagging followed by manual review) of the publishable content items 18, it may be determined that additional rules need to be added to the system to improve quality. This may be done by adding system-operator defined rules 14 via a system operator portal 20.

FIG. 2 shows the process of presenting a selection of publishable content items 18 according to user-selected criteria. The repository of publishable content items 18 is accessed, and user preferences 22 are applied to the content items 18 by a filtering step 24. This results in a subset of the publishable content items 18 which match the user preferences. A ranking step 26 is then applied, which may take into account for example number of (positive) reviews of content items, when the content item was created, and other relevant metadata. In addition, in some embodiments the user preferences 22 may be taken into account again at the ranking step. For example, for "extent" preferences, content items which match the user's preference but which are close to the cut-off may be demoted in the ranking. As an example, if the user wants recipes with energy content below 600 calories per portion, the ranking algorithm may demote a content item which is 590 calories in preference of content items which are only 500 calories, although all of these items are within the criteria and therefore could be selected. In some embodiments, preferences may be "fuzzy". This may allow some content items to be presented even if they do not exactly meet criteria. For example, where energy content below 600 calories has been presented but there are not enough recipes meeting this criteria to fill a chapter, the system could allow recipes with slightly more than this, as a "best match" to the user's preferences. Both binary and extent preferences could be enhanced with a "preferably" option which would allow recipes which did not meet the criteria exactly to be included, but would demote them in the ranking. Alternatively, users could specifically use a "definite" option to insist that a particular preference was met exactly, and any content items not complying with the preference would be filtered out.

As a result of the filtering 24 and ranking 26 processes, a sorted list of presentable content items 28 is generated. In many cases, this sorted list will still be too long to show to the user, and the highest ranked items on the list (say, the top 5 or 10) will be presented to the user, at least initially.

FIG. 3 shows an example user interface through which user preferences 22 may be chosen. "Absolute" preferences are binary preferences—i.e. either the content item has a particular property or it does not. Examples might be recipes that are suitable for vegetarians, recipes that do not contain gluten, walks which begin at a car park with a public toilet, etc. Absolute preferences are presented to the user by checkboxes 22a, 22b, 22c.

FIG. 3 also shows three "extent" preferences 22d, 22e, 22f. Extent preferences are used to select against value-based metadata associated with the content items. For example, walks in the countryside could be short or long. The user could choose to see only walks less than 5 miles long. In a recipe book, extent preferences could be used for example for calorie content, or preparation time, or a "difficulty" rating.

FIG. 4 shows an example user interface 30 for selecting chapters for a personalized book. Chapters in the book relate to tags associated with content items. Content items may have multiple tags across multiple categories. Tags may be divided into categories as different ways of dividing up content items. For example, in category 1 for a recipe book, there could be available chapters (tags) for 'starters', "mains", "desserts", "drinks", "snacks", etc. Category 2 might allow a different type of division/sorting of the content items, for example category 2 might be "occasions" and include chapters (tags) for "Christmas", "birthdays", "weddings", etc.

In this embodiment, the user selects which chapters they want, up to a maximum number, and is then presented with content items for selection based on both user preferences 22 and chapter selections from interface 30.

FIG. 5 shows a process for printing a book and dispatching it to the user, according to a final book layout generated by the method. An order record 32, which is a record in an order database, is created when a user completes a final book layout. The order record 32 includes the completed final book layout, as well as account, delivery and order information. In this embodiment the final book layout is sent as two files, one file 36 for the cover of the book and one file 34 for all the pages. Each file is a printable file, for example a PDF file, although the format will depend on the requirements of the printing service. Along with the final book layout files 34, 36, order header information 38 is sent. This is as much information as the printing service (which could be remote) needs to complete the order. In some embodiments, this may simply be a numeric identifier so that the finished product can be matched back to an order. However, in other embodiments, the printing service may also be responsible for dispatch of the book to the customer, in which case delivery details will also need to be sent.

Once the printing service 40 produces the book, order status information is written back to the order record 32 (box 42).

FIG. 6 shows an example of a menu user interface which may be provided as part of a system operator portal 20. The various functions and configuration options available to the system operator are described below:

"Global text replacement" allows rules to be defined for replacement of text across content items. This may be used to enforce consistency of terminology and style, i.e. change "&" to "and", change "teaspoon" to "tsp." in an ingredients list, etc.

"Record specific replacement" allows editing of individual content items. The system operator may search for particular records and make modifications to them, perhaps in response to customer feedback or to automatic or manual flagging of errors or inconsistencies. In some embodiments, content items which are commonly rejected by users may be flagged for review, in case the reason for rejection is an error in the content.

"Rejected content management" identifies content items which are never, or rarely, selected so that they appear as part of the selection presented to users. This may be, for example, because they do not fit in any templates, or they fit in templates for only a small number of book formats. The content may be edited to correct this. Content items may also be underutilized if metadata has been set wrongly, so that the content item will be wrongly excluded at the filtering stage.

"Template management" allows the system operator to make changes to templates for use within each book format. Preferably, this is via a visual editor similar to a desktop publishing package.

"Tag type ranking" allows the system operator to manage how chapter selection is presented to the user, based on the tags in the underlying content items.

"Global tag addition" allows the system operator to define and manage tags and categories of tags, i.e. add a new chapter which can be selected.

"Record specific tag addition and record specific tag override" allows the system operator to link specific content items to specific tags (e.g. record that a particular recipe is associated with "Christmas".)

"Extent preferences" may be used to map tags and values in the metadata of content items to sliders (22d, e, f) in the user interface, including defining cut-off points. For example, a user may be presented with a "difficulty" slider from easy to hard. This may map to multiple metadata points, including discrete "difficulty" tags in content items which might be marked "easy", "intermediate" or "advanced", as well as value-based tags, for example there could be a tag for preparation time in minutes. The extent preferences allow the system operator to define how these different fields are taken into account when a user expresses a preference for recipes (for example) which are more or less difficult.

"Absolute preferences" may be used in a similar way in order to map tags and values in the metadata of content items to binary choices in the interface.

FIG. 7 shows an overview of one embodiment of the invention. As previously described, content items are taken from a source database 10 and processing rules 16 are applied in order to generate publishable content items which are stored in a local database 18. A further internal database 19 holds more temporary data, for example user preferences which have been saved between sessions, including personal and billing information.

User preferences 22 are then applied to support filtering 24 and ranking 26 of results. The ranking may take into account (at step 27) rules input by the system operator portal 20. The user is then presented with a full list 28 of potential content items for each selected chapter. For each presented item, the user may reject it (step 29) or accept it (step 31). If it is rejected then the filtering 24 and ranking 26 steps are repeated to find another suitable item to replace the rejected content item. If the user accepts the item then it forms part of the book. When all items are selected (or in some embodiments this may start to happen in parallel, as soon as at least one item has been selected), each selected content item is allocated to a template from a template library in step 44. The content item is the applied to the template in step 46, according to parameters set in the system operator portal 20. At step 48, the iterative process of optimizing the application of the content item to the template is completed, resulting in a print layout. This is composed with print layouts from all the other content layouts to form a final book layout 50, which is then sent to the print service at step 52.

FIG. 8 illustrates part of what is involved in applying a content item to a template. The content item is split into objects, in this case eight objects "title", "description", "info", "ingredients", "method", "image", "nutrition" and "notes". The objects in the content item will correspond with area on the template. Each template area has properties associated with it, some of which may be immutable (e.g. the title is always bold and of a certain color) but some of which might be able to change in order to best present the data (e.g. text size of line spacing may be allowed to be altered slightly to present content blocks of different lengths on templates and achieve a good looking result.

Once each object is rendered, its size may be measured.

FIG. 9 further illustrates the process of setting parameters and "drawing" a page by applying a layout to a content item. Each object has parameters that are set, and the object will place its content depending on the current Y position. Once rendered it will measure its end position and return back the new current Y position. All objects are checked to see if they exceed the total page height less the current Y position and adjust accordingly. Once data has been placed, the system behind the object calls the next object passing on the new Y position.

FIG. 10 shows an example generated print layout, in which a content item (a recipe for mushroom risotto) has been automatically applied to a template to produce a print layout.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of producing a book, the method comprising:
accessing a database of source content items;
processing the source content items to create publishable content items by changing the source content items according to pre-set rules;
providing a user interface and soliciting input of one or more filtering criteria from a user;
presenting a selection of the publishable content items on the user interface, the presented publishable content items being selected according to the filtering criteria;
providing on the user interface a facility for the user to further select from the presented content items, or request further or different content items to be presented, to define a group of user-selected content items;
accessing a library of templates, and assigning a template to each of the user-selected content items;
for each user-selected content item and assigned template:
applying the user-selected content item to its assigned template using a set of parameters to generate a print layout;
automatically testing the generated print layout against pre-set layout quality criteria;
if the layout quality criteria are met, then finalizing the print layout;
otherwise, adjusting the parameters of the user-selected content item as applied to the template, to optimize the print layout, and returning to automatically testing the generated print layout against pre-set layout quality criteria;
composing the finalized print layouts into a final book layout;
printing a book according to the final book layout.

2. The method according to claim 1, in which at least one filtering criterion is an absolute criterion.

3. The method according to claim 1, in which at least one filtering criterion is an extent-based criterion.

4. The method according to claim 1, in which publishable content items matching the filtering criteria are ranked by ranking rules, and in which the selection of content items presented to the user is a subset of the publishable content items matching the filtering criteria, according to the ranking.

5. The method according to claim 4, in which the ranking rules include one or more random rules.

6. The method according to claim 4, in which the ranking rules include one or more rules taking into account whether a particular content item has been rejected or selected by users in the past.

7. The method according to claim 1, in which a pre-set number of publishable content items are always presented on the user interface, and in which a presented publishable content item is swapped for a different publishable content item in response to a user input rejecting a presented publishable content item.

8. The method according to claim 1, in which processing the content items to create publishable content items includes stripping out hyperlinks.

9. The method according to claim 1, in which processing the content items to create publishable content items includes automatically flagging content items which require review, and manually reviewing and editing flagged content items.

10. The method according to claim 1, in which processing the content items to create publishable content items includes applying one or more automatic replacement rules to text in the content items.

11. The method according to claim 10, in which the replacement rules may be defined by a system operator via a system operator control portal.

12. The method according to claim 1, in which processing the content items to create publishable content items includes automatically assessing each content item against each template in the template library and making a determination as to compatibility of each content item with each template.

13. The method according to claim 12, in which the determination as to compatibility of each content item includes a non-binary value indicating the estimated presentation quality of the content item as applied to the template.

14. The method according to claim 1, in which the layout quality criteria includes a comparison of the height of a content item object with a pre-set comparator associated with the template.

15. The method according to claim 1, in which the layout quality criteria includes a count of single lines of text at the beginning or end of columns, in a generated print layout.

16. The method according to claim 1, in which the layout quality criteria includes a comparison of the number of bullet points in one column with the number of bullet points in an adjacent column.

17. The method according to claim 1, in which a visual user interface is provided for a system operator to design templates and insert new templates into the template library.

18. The method according to claim 1, further including automatically accepting a payment from a user, and collecting customer details required to dispatch the book.

19. A non-transient computer-readable medium containing instructions, which, when executed on a computer, cause the computer to carry out the method of claim 1.

20. A system adapted to carry out the method of claim 1, the system including a computer, or multiple computers connected by a data network, and software running on the computer(s) causing the computer(s) to carry out the method of claim 1.

* * * * *